Patented Sept. 18, 1923.

1,468,608

UNITED STATES PATENT OFFICE.

WILLIAM THOMAS FORSE, FREDERICK WILLIAM JONES, JR., AND GEORGE WALTERS, OF LONDON, ENGLAND, ASSIGNORS TO COLUMBIA GRAPHOPHONE MANUFACTURING COMPANY, OF BRIDGEPORT, CONNECTICUT, A CORPORATION OF DELAWARE.

PHONOGRAPH-RECORD MATERIAL.

No Drawing.  Application filed November 16, 1922.  Serial No. 601,267.

*To all whom it may concern:*

Be it known that we, WILLIAM THOMAS FORSE, FREDERICK WILLIAM JONES, Jr., and GEORGE WALTERS, subjects of the King of Great Britain and Ireland, and residing at London, England, have invented certain new and useful Improvements in Phonograph-Record Materials, of which the following is a specification.

This invention relates to the manufacture of plastic or thermoplastic materials—that is, materials which are capable of being made to flow, or of being moulded under the application of heat and (or) pressure.

The invention has more particular reference to the class of plastic or thermoplastic materials having as their basis a nitric ester which is associated with a gelatinizing agent, and also with a suitable filling material.

The object of the present invention is to provide improved plastic or thermoplastic materials of the above class which may be mouldable at a temperature of about or below 140° C. and with the aid of pressure for the manufacture or production of gramophone records or other articles for the preparation of which such materials may be used.

The invention consists in a plastic or thermoplastic material of the class referred to, having one or more resins as an ingredient thereof.

More specifically, the invention consists in a plastic or thermoplastic material of the class referred to, having an acaroid resin as an ingredient.

The invention also consists in articles formed from thermoplastic material of the above character, and other details hereinafter described or indicated.

In carrying our invention into effect in one convenient manner, we form our improved thermoplastic material with a base of nitrocellulose and a non-volatile gelatinizer of nitrocellulose, of which the following may be given as examples:

Nitro hydrocarbons e. g., di-nitrotoluenes.
Urethanes e. g., phenyl urethane.
Substituted ureas e. g., di-ethyl-di-phenyl-urea.
Anilides or their homologues e. g., form-o-toludide.

The base, so formed, is mixed with a more or less plastic or viscous material, such as resinous substances, which fuse with the base when moulded at the moulding temperature, and there may also be added one or more filling materials—such, for example, as barium sulphate, carbon black, rotten stone, or kieselguhr, the object of these latter substances being to cheapen the process of production and impart a certain degree of hardness to the finished material.

In practice, we prefer to use the nitrocellulose of low nitrogen content known as "collodion cotton," but we do not restrict our invention to any particular nitric ester, or form of nitrocellulose, and the non-volatile gelatinizer, or mixture of gelatinizers, is selected to give the best results according to the particular base employed. The resinous substance may be any natural resin—such as copal, shellac, gum-resin, or synthetic resins (such as phenolic condensation products)—although we prefer to employ one or more of the resins known as "acaroid resins," or "xanthorrhea resins;" and the filler adopted may be of a character depending upon whether it is desired merely to cheapen the cost of manufacture, or on any particular properties which it may be desired to impart to the finished product or material.

As an example of the application of our invention, we may instance the production of a gramophone record, for which purpose we preferably employ a thermoplastic material of the following composition:—

Nitrocellulose (11% nitrogen), 18.5% or approximately 1⅓ parts.
Form-o-toludide (formanilide gelatinizer), 14.0% or approximately 1 part.
Acaroid resin, 14.0% or approximately 1 part.
Barium sulphate, 49.0% or approximately 3 parts.
Lampblack, 4.5% or approximately 3 parts.

These ingredients may be incorporated in a mixing-machine, or by the aid of heated rolls, and with small quantities of a volatile substance—such as acetone or ethyl alcohol—the mass being then worked at a temperature of, say, 100° C. for the purpose of removing any excess of the volatile solvent. The mass is then allowed to cool and is subsequently ground into a powder which may be heated on to paper, of which a number of layers may be employed for the production of the gramophone record; or the plastic mass, while still hot, may be formed into circular blocks, of correct size, which may subsequently be re-heated and pressed in the record mould.

It will be obvious that there are many ways in which the material may be prepared and treated, depending upon the character of the article which is to be formed therefrom, and the following methods are given merely by way of example:—

(1) The ground ingredients from which the thermoplastic material is to be formed, are incorporated between heated rolls until the plastic mass is uniform, the formation of the plastic mass being facilitated by the addition of a small percentage of volatile solvents—such as amyl acetate, or ethyl alcohol. The incorporated mass may be formed into suitable shape by moulding; or it may be ground into powder, or otherwise treated or stored for future use.

(2) The nitrocellulose is gelatinized in any known manner by the aid of heat, and with or without a volatile medium—such as amyl acetate, acetone, or alcohol—and to the gelatinized mass the other ingredients may be added and with which they may be incorporated in any suitable manner, the finally mixed materials being subsequently used as described in example 1.

(3) The materials may be formed into a paste by the aid of volatile solvents, so that they may be spread on the surface of objects or of some other thermoplastic material which may be pressed or moulded to give an article composed of the composite materials; or, alternatively, the materials of the thermoplastic substance may be spread on to paper and dried, and the coated papers then pressed on to some other thermoplastic material or core.

(4) The ground material, prepared as in example 1 or 2, may be placed on paper, or like material, in a thin layer, and heated in order to cause it to cohere, the coated papers then being used as suggested in example 3.

(5) The material prepared as in example 1 or 2 may be pressed or rolled into sheets which may then be pressed on to an object or mould, or used in a similar manner with any suitable core.

It is to be understood that the foregoing details are given by way of illustration and not of limitation, as it will be obvious that we may vary the materials employed in connection with the nitric ester and resin, the proportions in which the various ingredients are used, and the manner of preparing and employing the thermoplastic material so produced, depending upon the purpose for which the material is to be employed, or any particular practical requirements that may have to be fulfilled.

Having now particularly described and ascertained the nature of our said invention, and in what manner the same is to be performed, we declare that what we claim is:—

1. As a new article of manufacture, a nitrocellulose phonograph record including acaroid resin.

2. As a new article of manufacture, a nitrocellulose record including acaroid resin and a filler.

3. A nitrocellulose phonograph record including one of the resins of the class known as "acaroid" or "xanthorrhea."

4. A record for phonographs or the like, characterized in that the plastic material used in its manufacture contains acaroid resin besides a nitrocellulose, a gelatinizer, and filling agents.

5. A record according to claim 4, characterized in that the quantity of acaroid resin in the plastic material does not exceed that of the gelatinizer.

6. A phonograph record composed of one part nitrocellulose, one part acaroid resin, one part gelatinizer, and at least three parts of filling material.

In testimony whereof we have signed our names to this specification.

WILLIAM THOMAS FORSE.
FREDERICK WILLIAM JONES, Jr.
GEORGE WALTERS.

Witnesses:
JAMES VAN ALLEN SHIELDS,
L. SCHINDEL.